(12) United States Patent
Bulan et al.

(10) Patent No.: US 10,176,384 B2
(45) Date of Patent: *Jan. 8, 2019

(54) METHOD AND SYSTEM FOR AUTOMATED SEQUENCING OF VEHICLES IN SIDE-BY-SIDE DRIVE-THRU CONFIGURATIONS VIA APPEARANCE-BASED CLASSIFICATION

(71) Applicant: Conduent Business Services, LLC, Dallas, TX (US)

(72) Inventors: Orhan Bulan, Henrietta, NY (US); Edgar A. Bernal, Webster, NY (US); Aaron M. Burry, Ontario, NY (US); Yusuf Oguzhan Artan, Demetevler/Ankara (TR)

(73) Assignee: Conduent Business Services, LLC, Dallas, TX (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/297,572

(22) Filed: Oct. 19, 2016

(65) Prior Publication Data

US 2017/0039432 A1 Feb. 9, 2017

Related U.S. Application Data

(63) Continuation of application No. 14/632,587, filed on Feb. 26, 2015, now Pat. No. 9,483,838.
(Continued)

(51) Int. Cl.
*H04N 5/00* (2011.01)
*G06T 7/20* (2017.01)
(Continued)

(52) U.S. Cl.
CPC ..... *G06K 9/00785* (2013.01); *G06K 9/00771* (2013.01); *G06K 9/4609* (2013.01);
(Continued)

(58) Field of Classification Search
CPC ...... H04N 5/232; H04N 5/23229; H04N 7/18; G06Q 30/00; G06Q 50/12; G06T 7/20; G06K 9/00; G06K 9/00771
See application file for complete search history.

(56) References Cited

U.S. PATENT DOCUMENTS 5,465,115 A 11/1995 Conrad et al.
5,581,625 A 12/1996 Connell
(Continued)

OTHER PUBLICATIONS

U.S. Appl. No. 13/975,245, filed Aug. 23, 2013, Gross et al.
(Continued)

*Primary Examiner* — Jeffery A Williams
*Assistant Examiner* — Patricia I Young
(74) *Attorney, Agent, or Firm* — Fay Sharpe LLP

(57) ABSTRACT

This disclosure provides a method and system for automated sequencing of vehicles in side-by-side drive-thru configurations via appearance-based classification. According to an exemplary embodiment, an automated sequencing method includes computer-implemented method of automated sequencing of vehicles in a side-by-side drive-thru, the method comprising: a) an image capturing device capturing video of a merge-point area associated with multiple lanes of traffic merging; b) detecting in the video a vehicle as it traverses the merge-point area; c) classifying the detected vehicle associated with traversing the merge-point area as coming from one of the merging lanes; and d) aggregating vehicle classifications performed in step c) to generate a merge sequence of detected vehicles.

20 Claims, 11 Drawing Sheets

Related U.S. Application Data

(60) Provisional application No. 61/984,119, filed on Apr. 25, 2014.

(51) Int. Cl.

| | | |
|---|---|---|
| *G06Q 50/12* | (2012.01) | |
| *G06K 9/00* | (2006.01) | |
| *H04N 5/232* | (2006.01) | |
| *G06K 9/46* | (2006.01) | |
| *G06K 9/62* | (2006.01) | |
| *G06T 7/00* | (2017.01) | |

(52) U.S. Cl.
CPC ......... *G06K 9/6212* (2013.01); *G06K 9/6267* (2013.01); *G06T 7/0044* (2013.01); *G06T 7/20* (2013.01); *H04N 5/23229* (2013.01); *G06Q 50/12* (2013.01); *G06T 2207/20081* (2013.01); *G06T 2207/30236* (2013.01); *G06T 2207/30248* (2013.01)

(56) References Cited

U.S. PATENT DOCUMENTS

| | | | |
|---|---|---|---|
| 5,953,055 | A | 6/1999 | Huang et al. |
| 6,195,121 | B1 | 2/2001 | Huang et al. |
| 6,654,047 | B2 | 11/2003 | Hzaka |
| 7,688,349 | B2 | 3/2010 | Flickner et al. |
| 8,401,230 | B2 | 3/2013 | Kozitsky et al. |
| 2013/0265419 | A1 | 10/2013 | Bulan et al. |
| 2014/0063256 | A1 | 3/2014 | Mongeon et al. |
| 2014/0063263 | A1 | 3/2014 | Bernal et al. |
| 2014/0064566 | A1 | 3/2014 | Shreve et al. |

OTHER PUBLICATIONS

U.S. Appl. No. 14/022,488, filed Sep. 10, 2013, Loce et al.
U.S. Appl. No. 14/260,915, filed Apr. 24, 2014, Burry et al.
U.S. Appl. No. 14/261,013, filed Apr. 24, 2014, Bernal et al.
Agentvi, "Video Analytics Applications for the Retail Market", created Jan. 23, 2012, http://www.agentvi.com/images/Agent_Vi_-_Retail_Applications.pdf.
Bay et al., "SURF: Speeded Up Robust Features", Computer Vision and Image Understanding, V. 110.3, 2008, p. 346-359.
Comaniciu et al., "Real-Time Tracking of Non-Rigid Objects Using Mean Shift", Proceedings of IEEE Conference on Computer Vision and Pattern Recognition, 2000, p. 142-149.
Dalal et al., "Histograms of Oriented Gradients for Human Detection", 2005.
Dickmanns et al., "Dynamic Monocular Machine Vision", Machine Vision and Applications, 1988, p. 223-240.
Forssen et al., "Shape Descriptors for Maximally Stable Extremal Regions", Proceedings of IEEE Conference on Computer Vision and Pattern Recognition, 2007.
Gustafsson et al., "Particle Filters for Positioning, Navigation and Tracking", IEEE Transactions on Signal Processing, 2002.
Harris et al., "A Combined Corner and Edge Detector", Alvey Vision Conference, vol. 15, 1988, p. 147-152.
Honeywell Security, "Intelligent Video Analytics for: The Retail Applications Market", Sep. 2007, http://www.security.honeywell.com/uk/video/documents/VideoAnalytics_Retail_UK.pdf.
Horn et al., "Determining Optical Flow", Artificial Intelligence 17, 1981, p. 185-203.
Huang et al., "Survey on Block Matching Motion Estimation Algorithms and Architectures With New Results", Journal of VLSI Signal Processing Systems 42, 2006, p. 297-320.
Kass et al., "Snakes: Active Contour Models", International Journal of Computer Vision, 1988, p. 321-331.
Ke et al., "PCA-SIFT: A More Distinctive Representation for Local Image Descriptors", Proceedings of IEEE Conference on Computer Vision and Pattern Recognition, 2004.
Lo et al., "Automatic Congestion Detection System for Underground Platforms", Proceedings of 2001 International Symposium on Intelligent Multimedia, Video and Speech Processing, May 2-4, 2001, p. 158-161.
Lowe, "Distinctive Image Features From Scale-Invariant Keypoints", 2004, p. 91-110.
Malarov, et al., "Intrusion Detection Using Extraction of Moving Edges", $12^{th}$ IAPR Int'l Conf. on Pattern Recognition, V.1, 1994, p. 804-807.
Oliver et al., "A Bayesian Computer Vision System for Modeling Human Interactions", IEEE Transactions on Pattern Analysis and Machine Intelligence, vol. 22, No. 8, Aug. 2000, p. 831-843.
Pillar, Real Value in Video Analytics, Integrated Solutions for Retailers, Jul. 26, 2010, http://www.retailsolutionsonline.com/doc/real-value-in-video-analytics-0001.
Retail Touch Points, "Video Analytics Solutions Help Retailers Optimize Customer Service and Workforce management", Dec. 9, 2011, http://www.retailtouchpoints.com/retail-store-ops/1230--video-analytics-solutions-help-retailers-optimize-customer-service-and-workforce-management.
Rosten et al., "Machine Learning for High-Speed Corner Detection", Computer Vision ECCV 2006, p. 430-443.
Schmitt, "Checking in on "Minority Report" Video Analytics and Hyper-Targeting in Retail", Retail Touch Points, Feb. 3, 2011, http://www.retailtouchpoints.com/in-store-insights/714-checking-in-on-minority-report-video-analytics-and-hyper-targeting-in-retail.
Scopix Solutions, "Retail Video Analytics", http://www.scopixsolutions.com/solutions/.
Seniot et al., "Video Analytics for Retail", 2007, http://rogerioferis.com/publications/FerisAVSS07b.pdf.
Stauffer et al., "Adaptive Background Mixture Models for Real-Time Tracking", Proceedings of the 1999 Conference on Computer vision and Pattern Recognition, 1999, p. 2246-2252.
Tomasi et al., "Detection and Tracking of Point Features", Technical Report CMU-CS-91-132, Carnegie Mellon University, School of Computer Science, 1991.
Zhu et al., "Face Detection, Pose Estimation, and Landmark Localization in the Wild", Proceedings of IEEE Conference on Computer Vision and Pattern Recognition, 2012.

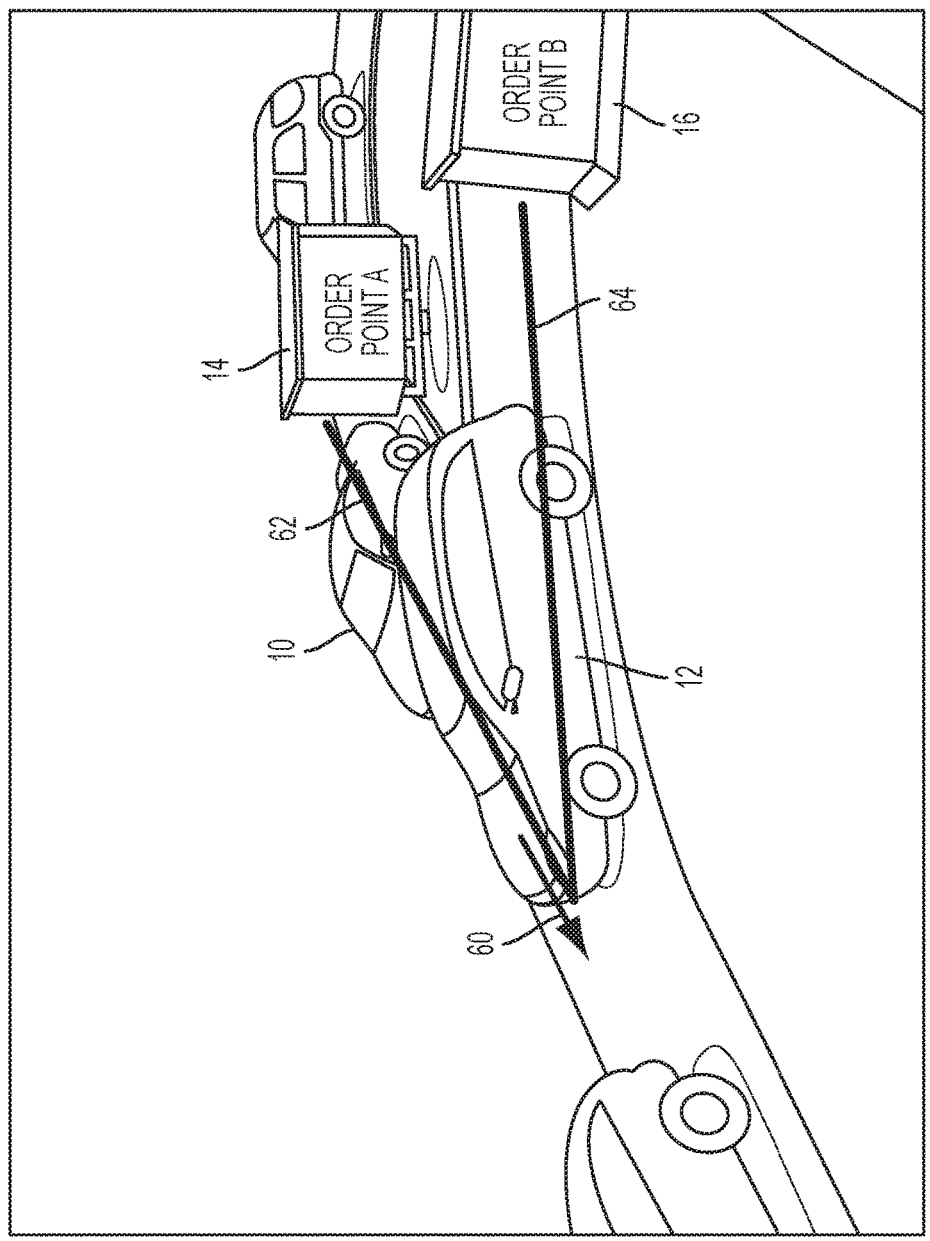

METHOD AND SYSTEM FOR AUTOMATED SEQUENCING OF VEHICLES IN SIDE-BY-SIDE DRIVE-THRU CONFIGURATIONS VIA APPEARANCE-BASED CLASSIFICATION

CROSS REFERENCE TO RELATED PATENTS AND APPLICATIONS

This application is a continuation of U.S. patent application Ser. No. 14/632,587, filed on Feb. 26, 2015, by Bulan et al. and entitled "METHOD AND SYSTEM FOR AUTOMATED SEQUENCING OF VEHICLES IN SIDE-BY-SIDE DRIVE-THRU CONFIGURATIONS VIA APPEARANCE-BASED CLASSIFICATION", which claims priority to U.S. Provisional Application No. 61/984,119, filed on Apr. 25, 2014, by Bulan et al. and entitled "METHOD AND SYSTEM FOR AUTOMATED SEQUENCING OF VEHICLES IN SIDE-BY-SIDE DRIVE-THRU CONFIGURATIONS VIA APPEARANCE-BASED CLASSIFICATION", which are incorporated herein by reference in their entirety.

BACKGROUND

Due to its increased customer throughput relative to traditional single order point drive-thru configurations, a side-by-side drive-thru configuration has become a standard configuration to which newly built quick-serve restaurants adhere, as well as the configuration to which many existing restaurants are migrating. While the side-by-side drive-thru configuration has benefits related to the maximum drive-thru customer per hour rate that a restaurant can achieve, thus reducing the number of "drive-off" occurrences (in which a customer arrives, concludes that the line is too long or has to wait longer than planned, and so decides to leave,) the side-by-side drive-thru presents new challenges to restaurant managers and employees. One such challenge is the determination of a correct customer order sequence; as vehicles can become shuffled from the time the customer order is placed and the time the customer receives the goods ordered, due to the parallel nature of the configuration, see U.S. Pat. No. 8,401,230, granted on Mar. 19, 2013, to Kozitsky et al. and entitled "SIGNATURE BASED DRIVE-THROUGH ORDER TRACKING SYSTEM AND METHOD", and U.S. application Ser. No. 14/022,488, filed Sep. 9, 2013, by Loce et al. and entitled "DETERMINING SOURCE LANE OF MOVING ITEM MERGING INTO DESTINATION LANE". Since there are two separate lanes with ordering consoles and then the two separate lanes merge again into a single lane for payment and pickup, the two separate ordering points and re-merging of the lanes can cause a mismatch between the sequence in which the customer orders were taken and the sequence of vehicles that arrive at the pay and pickup counters. This "out of sequencing" may result in incorrect prices charged to the customer and/or the delivery of the incorrect food to the customer, contributing significantly to customer dissatisfaction. Even in the case where the accuracy of the delivered orders is maintained, these out of sequence events result in significant time loss, i.e., inefficiencies, as the employees are required to manually re-sequence the ordered food to match the sequence of vehicles in the pickup queue.

INCORPORATION BY REFERENCE

U.S. application Ser. No. 13/975,245, filed Aug. 23, 2013, by Gross et al. and entitled "SYSTEM AND METHOD FOR AUTOMATED SEQUENCING OF VEHICLE UNDER LOW SPEED CONDITIONS FROM VIDEO";

U.S. application Ser. No. 14/022,488, filed Sep. 9, 2013, by Loce et al. and entitled "DETERMINING SOURCE LANE OF MOVING ITEM MERGING INTO DESTINATION LANE";

U.S. application Ser. No. 14/260,915, filed Apr. 24, 2014, by Burry et al. and entitled "VIDEO TRACKING BASED METHOD FOR AUTOMATIC SEQUENCING OF VEHICLES IN DRIVE-THRU APPLICATIONS";

U.S. application Ser. No. 14/261,013, filed Apr. 24, 2014, by Bernal et al. and entitled "SYSTEM AND METHOD FOR VIDEO-BASED DETERMINATION OF QUEUE CONFIGURATION PARAMETERS";

U.S. Pat. No. 5,465,115, granted Nov. 7, 1995, to Conrad et al. and entitled "VIDEO TRAFFIC MONITOR FOR RETAIL ESTABLISHMENTS AND THE LIKE";

U.S. Pat. No. 5,581,625, granted Dec. 3, 1996, to Connell and entitled "STEREO VISION SYSTEM FOR COUNTING ITEMS IN A QUEUE";

U.S. Pat. No. 5,953,055, granted Jun. 14, 1999, to Huang et al. and entitled "SYSTEM AND METHOD FOR DETECTING AND ANALYZING A QUEUE";

U.S. Pat. No. 6,195,121, granted Feb. 27, 2001, to Huang et al. and entitled "SYSTEM AND METHOD FOR DETECTING AN ANALYZING A QUEUE";

U.S. Pat. No. 6,654,047, granted on Nov. 25, 2003, to Hzaka and entitled "METHOD OF AN DEVICE FOR ACQUIRING INFORMATION ON A TRAFFIC LINE OF PERSONS";

U.S. Pat. No. 7,688,349, granted on Mar. 30, 2010, to Flickner et al. and entitled "METHOD OF DETECTING AND TRACKING GROUPS OF PEOPLE";

U.S. Pat. No. 8,401,230, granted on Mar. 19, 2013, to Kozitsky et al. and entitled "SIGNATURE BASED DRIVE-THROUGH ORDER TRACKING SYSTEM AND METHOD";

U.S. Patent Publication No. 2013-0265419A1, published on Oct. 10, 2013, to Bulan et al. and entitled "SYSTEM AND METHOD FOR AVAILABLE PARKING SPACE ESTIMATION FOR MULTISPACE ON-STREET PARKING";

U.S. Patent Publication No. 2014-0063256A1, published on Mar. 6, 2014, to Mongeon et al. and entitled "QUEUE GROUP LEADER IDENTIFICATION";

U.S. Patent Publication No. 2014-0063263A1, published on Mar. 6, 2014, to Bernal et al. and entitled "SYSTEM AND METHOD FOR OBJECT TRACKING AND TIMING ACROSS MULTIPLE CAMERA VIEWS";

U.S. Patent Publication No. 2014-0064566A1, published on Jun. 6, 2014, to Shreve et al. and entitled "HEURISTIC-BASED APPROACH FOR AUTOMATIC PAYMENT GESTURE CLASSIFICATION AND DETECTION";

Agent VI, "Video Analytics Applications for the Retail Market", created Jan. 23, 2012, http://www.agentvi.com/images/Agent_Vi_-_Retail_Applications.pdf;

Bay et al., "SURF: Speeded Up Robust Features", Computer Vision and Image Understanding, V. 110.3, 2008, p 346-359;

Comaniciu et al., "Real-Time Tracking of Non-Rigid Objects Using Mean Shift", Proceedings of IEEE Conference on Computer Vision and Pattern Recognition, 2000, p 142-149;

Dalal et al., "Histograms of Oriented Gradients for Human Detection", 2005.

Dickmanns et al., "Dynamic Monocular Machine Vision", Machine Vision and Applications, 1988, p 223-240;

Forssen et al., "Shape Descriptors for Maximally Stable Extremal Regions", Proceedings of IEEE Conference on Computer Vision and Pattern Recognition, 2007;
Gustafsson et al., "Particle Filters for Positioning, Navigation and Tracking", IEEE Transactions on Signal Processing, 2002;
Harris et al., "A Combined Corner and Edge Detector", Alvey Vision Conference, Vol. 15, 1988, p 147-152;
Honeywell Security, "Intelligent Video Analytics for: The Retail Applications Market", September 2007, http://www.security.honeywell.com/uk/video/documents/VideoAnalytics_Retail_UK.pdf;
Horn et al., "Determining Optical Flow", Artificial Intelligence 17, 1981, p 185-203;
Huang et al., "Survey on Block Matching Motion Estimation Algorithms and Architectures With New Results", Journal of VLSI Signal Processing Systems 42, 2006, p 297-320;
Kass et al., "Snakes: Active Contour Models", International Journal of Computer Vision, 1988, p 321-331;
Ke et al., "PCA-SIFT: A More Distinctive Representation for Local Image Descriptors", Proceedings of IEEE Conference on Computer Vision and Pattern Recognition, 2004;
Lo et al., "Automatic Congestion Detection System for Underground Platforms", Proceedings of 2001 International Symposium on Intelligent Multimedia, Video and Speech Processing, May 2-4, 2001, p 158-161;
Lowe, "Distinctive Image Features From Scale-Invariant Keypoints", 2004, p 91-110;
Makarov, et al., "Intrusion Detection Using Extraction of Moving Edges", 12th IAPR Int'l Conf. on Pattern Recognition, V.1, 1994, p 804-807;
Oliver et al., "A Bayesian Computer Vision System For Modeling Human Interactions", IEEE Transactions on Pattern Analysis and Machine Intelligence, Vol. 22, No. 8, August 2000, p 831-843;
Pillar, Real Value in Video Analytics, Integrated Solutions for Retailers, Jul. 26, 2010, http://www.retailsolutionsonline.com/doc/real-value-in-video-analytics-0001;
Retail Touch Points, "Video Analytics Solutions Help Retailers Optimize Customer Service and Workforce management", Dec. 9, 2011, http://www.retailtouchpoints.com/retail-store-ops/1230-video-analytics-solutions-help-retailers-optimize-customer-service-and-workforce-management-;
Rosten et al., "Machine Learning for High-Speed Corner Detection", Computer Vision ECCV 2006, p 430-443;
Schmitt, "Checking In On "Minority Report" Video Analytics and Hyper-Targeting in Retail", Retail Touch Points, Feb. 3, 2011, http://www.retailtouchpoints.com/in-store-insights/714-checking-in-on-minority-report-video-analytics-and-hyper-targeting-in-retail;
Scopix Solutions, "Retail Video Analytics", http://www.scopixsolutions.com/solutions/;
Senior et al., "Video Analytics for Retail", 2007, http://rogerioferis.com/publications/FerisAVSS07b.pdf;
Stauffer et al., "Adaptive Background Mixture Models for Real-Time Tracking", Proceedings of the 1999 Conference on Computer vision and Pattern Recognition, 1999, p 2246-2252;
Tomasi et al., "Detection and Tracking of Point Features", Technical Report CMU-CS-91-132, Carnegie Mellon University, School of Computer Science, 1991; and
Zhu et al., "Face Detection, Pose Estimation, and Landmark Localization in the Wild", Proceedings of IEEE Conference on Computer Vision and Pattern Recognition, 2012, are incorporated herein by reference in their entirety.

BRIEF DESCRIPTION

In one embodiment of this disclosure, described is a computer-implemented method of automated sequencing of vehicles merging from multiple lanes into a single lane, the method comprising: a) an image-capturing device capturing video of a merge-point area associated with multiple lanes of traffic merging; b) detecting in the video a vehicle as it traverses the merge-point area; c) classifying the detected vehicle associated with traversing the merge-point area as coming from one of the merging lanes; and d) aggregating vehicle classifications performed in step c) to generate a merge sequence of detected vehicles.

In another embodiment of this disclosure, described is an image processing system comprising: a processor and a memory operatively associated with the processor, the processor and memory and execute instructions to perform a method of automated sequencing of vehicles merging from multiple lanes into a single lane, the method comprising: a) an image capturing device capturing video of a merge-point area associated with multiple lanes of traffic merging; b) detecting in the video a vehicle as it traverses the merge-point area; c) classifying the detected vehicle associated with traversing the merge-point area as coming from one of the merging lanes; and d) aggregating vehicle classifications performed in step c) to generate a merge sequence of detected vehicles.

In still another embodiment of this disclosure, described is a system for updating an event sequence, the system comprising an automatic sequencing device including a memory and a processor in communication with the processor configured to: receive a number of individual order requests from the two order points, each order request being received when a vehicle is located in the one of the two order points; acquire video data of a lane merge point area from at least one image source, the merge point area associated with the convergence of two vehicle queue lanes from two respective order points to a single queue lane; process one of frames and at least one region of interest (ROI) in frames of the video data to detect a vehicle including at least a portion of the vehicle in the lane merge point area; track a movement of each detected vehicle through the lane merge point area over a subsequent series of frames until the detected vehicle is outside the lane merge point area; in response to the detected and tracked vehicle associated with the lane merge point area, classify one or more video frames as including a vehicle coming from an outer lane associated with order point A or a vehicle coming from an inner lane associated with order point B; and update a sequence of the orders to match the determined sequence of vehicles in the single queue lane.

BRIEF DESCRIPTION OF THE DRAWINGS

FIG. 10 illustrates a comparison of vehicle tracking regions associated with merge area classification according to this disclosure and vehicle tracking from an order point to the merge area according to other methods.

DETAILED DESCRIPTION

Figure 1:
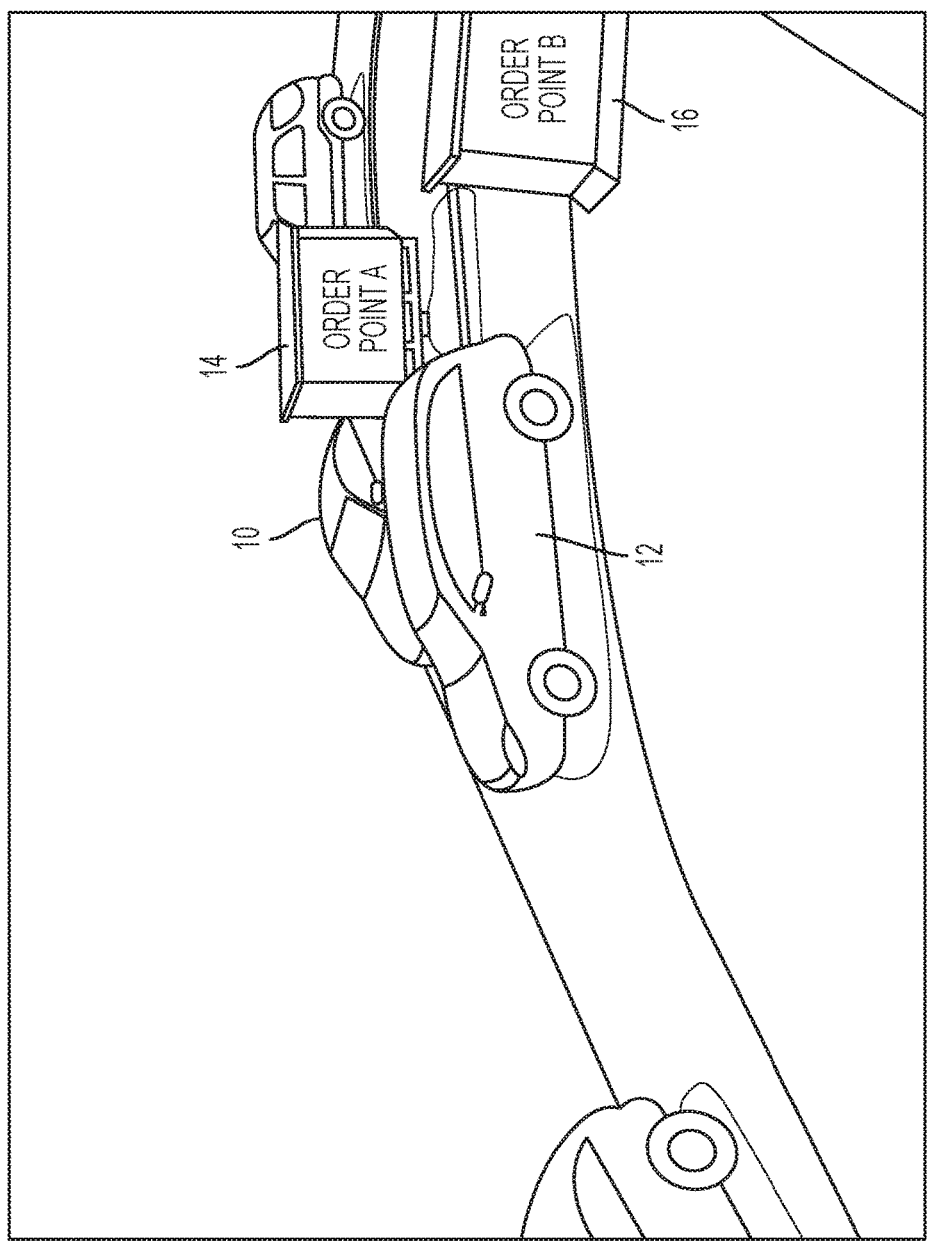
FIGS. 1 and 2 illustrate a sequence of examples of video including vehicle-to-vehicle occlusions associated with a side-by-side drive-thru lane configuration.

This disclosure provides an image or video-based method and system to automate post-merge sequencing that does not rely on tracking vehicles from an order point. An object-tracking-based approach would detect vehicles at the order point and track their location across times (i.e., across frames), and based on the temporal sequence of vehicle locations, make a determination as to which vehicle crosses the merge point first. In contrast, the proposed disclosure operates by detecting vehicles as they cross a merge point and, based on their appearance, classifies the vehicles as originating from an inner or outer lane. The method and system rely on an offline training stage where features of manually labeled samples of vehicles crossing a merge point are extracted and fed into a classifier for training; the trained classifier is subsequently used as an online classifier module during system operation.

The present disclosure provides an image- or video-based method and system to automate post-merge sequencing that does not rely on tracking vehicles from an order point. The method and system operate by detecting vehicles as they cross a merge point and, based on their appearance, classifying the detected vehicles as coming from the inner or outer lane associated with the side-by-side drive-thru configuration. The method and system comprise the following modules: (1) A video acquisition module including at least one video camera that acquires video of the drive-thru of interest; (2) a vehicle detection module that detects vehicles as they traverse the merge point via e.g., motion or foreground detection; (3) a vehicle tracking module that tracks detected vehicles until they leave the monitored merge-point area; (4) a classifier module that determines whether the detected vehicles are coming from the inner or outer drive-thru lane; and (5) a merge point sequence determination module that temporally aggregates outputs of the classifier module according to the output of the tracking module. The system relies on an offline stage where features of manually labeled samples of vehicles crossing the merge point are extracted and fed into a classifier for training; the trained classifier is then incorporated into the online stage for normal system operation.

As previously discussed in the background, due to its increased customer throughput relative to traditional configurations, a side-by-side drive-thru configuration has become the standard configuration to which newly built quick-serve restaurants adhere, as well as the configuration to which many existing restaurants are migrating. While it has benefits regarding the maximum drive-thru customer per hour rate that a restaurant can achieve, thus reducing the number of "drive-off" occurrences (in which a customer arrives, the customer concluding that the line is too long and so decides to leave,) it presents new challenges to restaurant managers and restaurant staff. One such challenge is the determination of the right order sequence, as vehicles can become shuffled between the time an order is placed and the time a customer receives the order, due to the parallel nature of the configuration, see U.S. Pat. No. 8,401,230, granted on Mar. 19, 2013, to Kozitsky et al. and entitled "SIGNATURE BASED DRIVE-THROUGH ORDER TRACKING SYSTEM AND METHOD", and U.S. application Ser. No. 14/022,488, filed Sep. 9, 2013, by Loce et al. and entitled "DETERMINING SOURCE LANE OF MOVING ITEM MERGING INTO DESTINATION LANE". Since there are two separate lanes with ordering consoles and then the two lanes merge again into a single lane for payment and pickup, the two separate ordering points and re-merging of the lanes can cause a mismatch between the sequence in which the orders were taken and the sequence of cars that arrive at the pay and pickup counters. This "out of sequencing" can result in the incorrect prices being charged to the customer and/or the delivery of the incorrect food to the customer, contributing significantly to customer dissatisfaction. Even if the accuracy of the delivered orders is maintained, these out of sequence events result in significant time loss, i.e., inefficiency, as the employees have to manually re-sequence the food orders to match the sequence of vehicles in the pickup queue.

Figure 2:
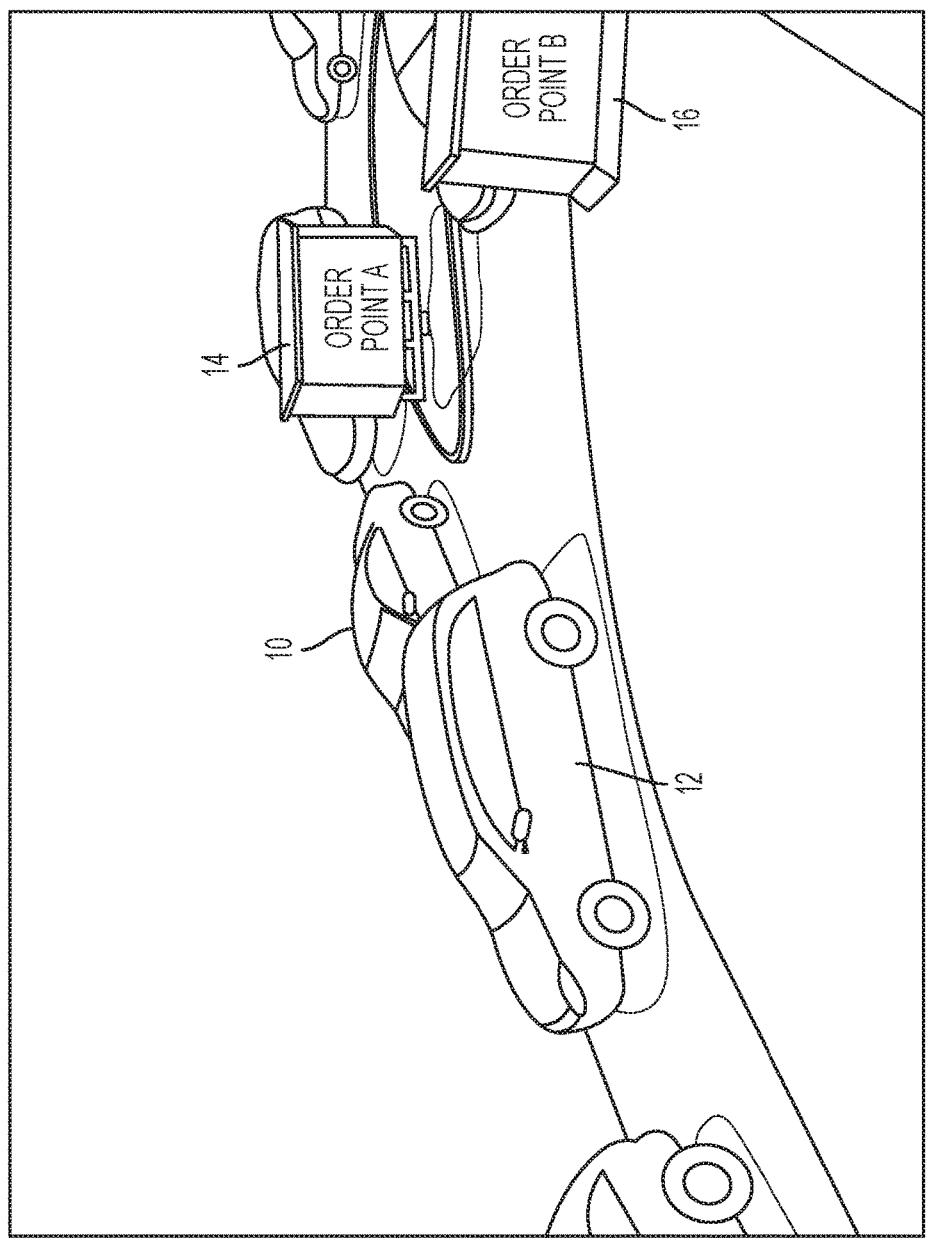

An automated method for accurately determining a post-merge sequence using a video camera to identify vehicles at each order point and track the identified vehicles through the merge point requires accurate and reliable tracking to maintain overall merge sequencing accuracy. Depending on the viewing angle of the video camera relative to the merge point area, accurately tracking vehicles may be difficult due to vehicle in one lane (usually the lane nearer to the camera) partially occluding vehicles in the other lane (usually the lane further from the camera) as illustrated in FIG. 1 and FIG. 2, where vehicle 12 partially occludes vehicle 10.

Other patents/patent applications which disclose automated merge-point order determination include Signature-based order tracking as disclosed in U.S. Pat. No. 8,401,230, granted on Mar. 19, 2013, to Kozitsky et al. and entitled "SIGNATURE BASED DRIVE-THROUGH ORDER TRACKING SYSTEM AND METHOD". Use of virtual trip-wires for automated sequencing of videos as disclosed in U.S. application Ser. No. 13/975,245, filed Aug. 23, 2013, by Gross et al. and entitled "SYSTEM AND METHOD FOR AUTOMATED SEQUENCING OF VEHICLE UNDER LOW SPEED CONDITIONS FROM VIDEO". Stereo-vision-based system for merge crossing detection as disclosed in U.S. application Ser. No. 14/022,488, filed Sep. 9, 2013, by Loce et al. and entitled "DETERMINING SOURCE LANE OF MOVING ITEM MERGING INTO DESTINATION LANE".

U.S. patent application Ser. No. 14/260,915 discloses an automated method and system for auto-merge-sequencing that relies on detecting vehicles at their respective order point and tracking them until they cross a merge point. Such a method requires accurate motion/foreground detection and tracking to maintain overall merge sequencing accuracy. Depending on the viewing angle of the camera relative to the merge point area, accurately detecting and tracking vehicles may be difficult due to vehicles in one lane, usually the lane nearer to the camera, occluding vehicles in the other lane, usually the lane farther from the camera, from the camera view as illustrated in FIGS. 1 and 2, where the van occludes the sedan.

Figure 3:
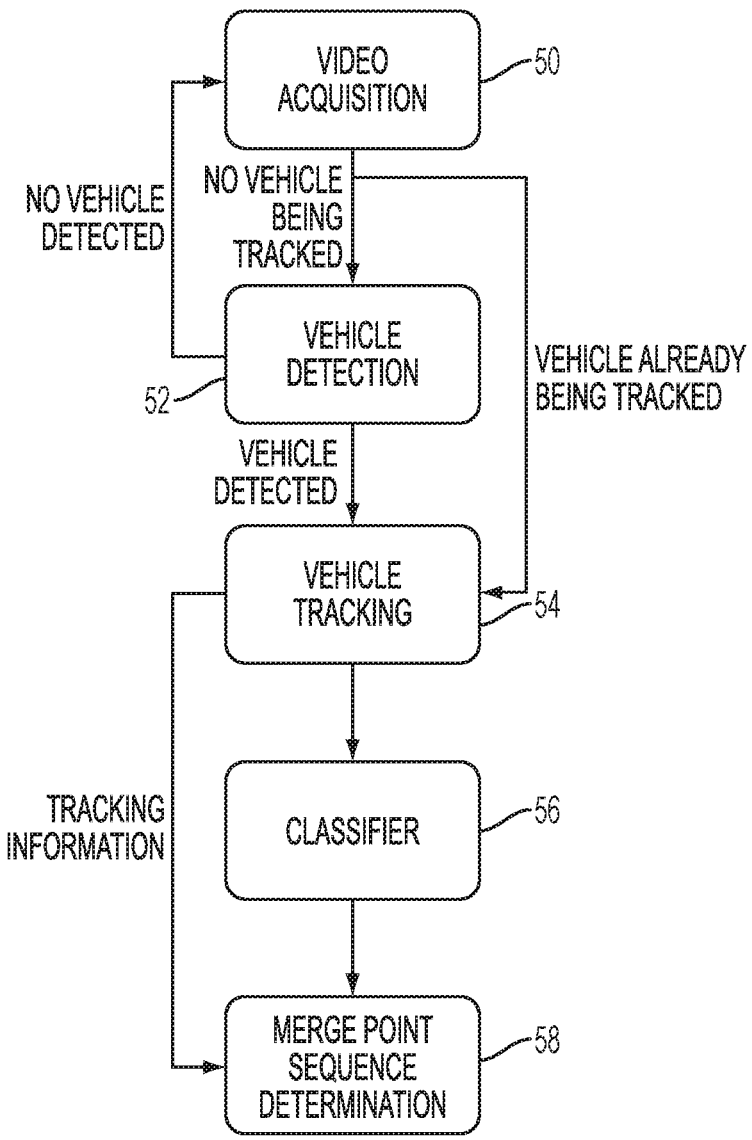
FIG. 3 is a flow chart of a method of tracking a vehicle via appearance-based classification according to an exemplary embodiment of this disclosure.

This disclosure provides an image- or video-based method and system to automate post-merge sequencing where the method and system do not rely on tracking vehicles from an order point but rather operates by detecting vehicles as they cross a merge point and, based on their appearance, classifying the vehicles as coming from an inner or outer lane associated with a drive-thru, i.e., two pre-merge point lanes. The method and system include the following modules, as illustrated in FIG. 3:

(1) A video acquisition module 50 including at least one video camera that acquires video of the merge-point area of interest;

(2) A vehicle detection module 52, e.g., motion or foreground detection, that detects vehicles as they traverse the merge point;

(3) A vehicle tracking module 54 that tracks vehicles as they traverse the merge point are, and keeps tracking them until they leave said area;

(4) A classifier module 56 that determines whether the detected vehicles are coming from the inner or outer drive-thru lane; and.

(5) A merge point sequence determination module 58 that temporally aggregates outputs of the classifier module according to the output of the tracking module and makes a determination regarding the observed merge sequence.

The method and system includes an offline stage where features of manually labeled samples of vehicles crossing the merge point are extracted and fed into a classifier for training. Then, the trained classifier is incorporated into the classifier module during the online operation of the system.

Figure 6:
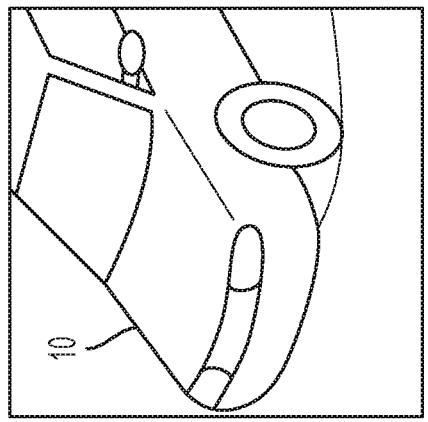
FIG. 4, FIG. 5 and FIG. 6 are images of vehicles traversing a merge point area associated with a side-by-side drive-thru lane, the vehicles coming from an outer point lane.
Figure 5:
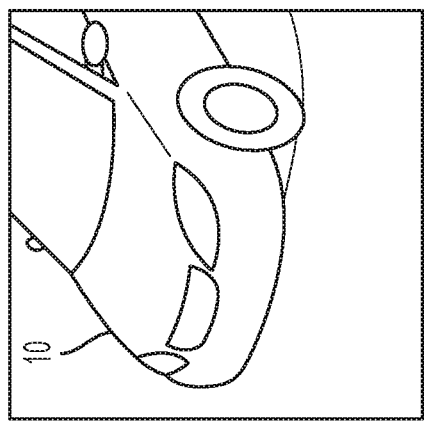
Figure 4:
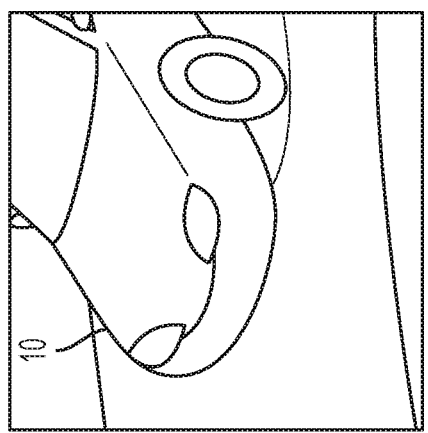
Figure 9:
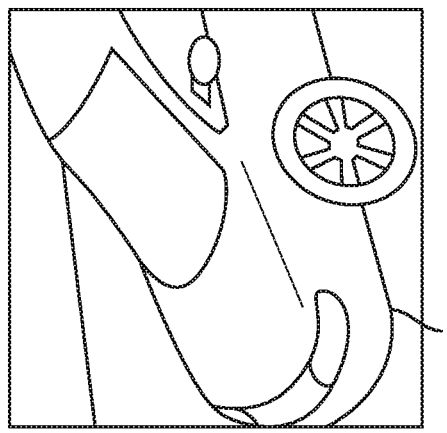
FIG. 7, FIG. 8 and FIG. 9 are images of vehicles traversing a merge point area associated with a side-by-side drive-thru lane, the vehicles coming from an inner order point lane.
Figure 8:
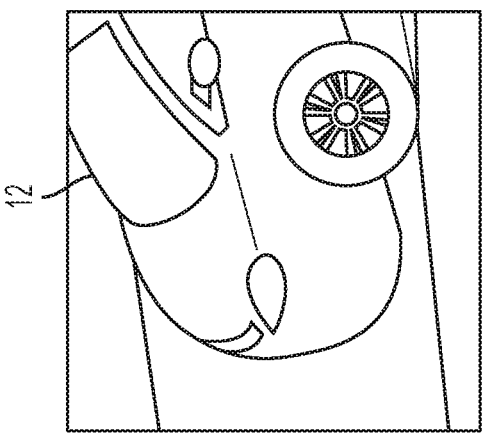
Figure 7:
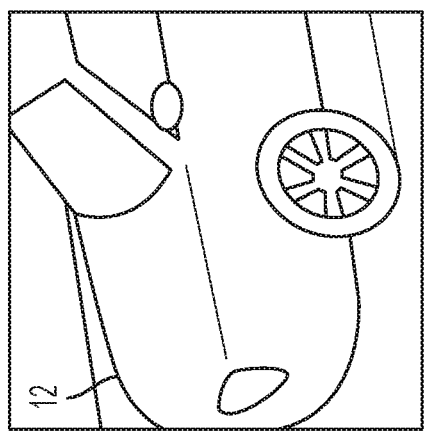

A principle on which the disclosed automated sequencing method operates is based on the fact that the appearance of vehicles traversing a merge point will vary significantly depending on the order point from where they come, as illustrated by the images in FIGS. 4-9. The images in FIGS. 4-6 illustrate the appearance of vehicles coming from an outer order point lane, while the images in FIGS. 7-9 show the appearance of vehicles coming from an inner order point lane associated with a drive-thru scene as shown in FIG. 1. The disclosed method and system learns the required image-based features to allow differentiation between the vehicle appearances associated with the inner and outer lanes and makes a decision as to which lane each new incoming vehicle is coming from based on its appearance and the learned appearance differences.

Various aspects of the method and system are now described in greater detail below.

1) Video Acquisition Module 50

The video acquisition module comprises at least one video camera that captures video of an area of interest. No specific requirements in terms of spatial or temporal resolutions are required. However, traditional surveillance cameras are typically IP (Internet Protocol) cameras with pixel resolutions of VGA (Video Graphics Array) and above (640×480) and frame rates of 15 fps (frames per second) and above. For example, a point and shoot RGB (Red Green Blue) camera with a 1280×720 pixel resolution and a frame rate of 30 fps, according to one exemplary embodiment of this disclosure.

2) Vehicle Detection Module 52

A vehicle detection module detects the presence of vehicles as they enter the merge point area. According to an exemplary embodiment of the algorithm, moving vehicle detection is performed by temporal differencing of frames. Other motion and foreground detection approaches such as those based on background estimation and subtraction, and optical flow can be used. Alternatively, and as illustrated in the description of the classifier module, the classification module can be used to perform vehicle detection in addition to the determination, i.e., classification, of which order lane, i.e., the inner or outer order point, the vehicle is coming from on a frame-by-frame basis. After a vehicle is detected, a tracker is initialized so as to monitor progress of the vehicle as it traverses the merge-point area. The vehicle detection module only operates if it is determined that the vehicle is not already being tracked because the system operates under the assumption that, at most, one vehicle can traverse the merge-point area at any given time.

3) Vehicle Tracking Module 54

A vehicle tracking module tracks the location of a detected vehicle as it moves across the merge point area. Examples of video-based object tracking algorithms that can be used include mean-shift tracking, point and global feature-based, silhouette/contour, and particle filter trackers. According to an exemplary embodiment, the local object tracking module establishes correspondences between multiple detections of an object across different frames. To that end, the tracking module may output a temporal sequence corresponding to data describing the location of the detected vehicle across the range of frames in which it is present within the area being monitored. Specifically, for each object being tracked, the local tracking module may output its location in pixel coordinates and the corresponding frame number across the range of frames for which the object remains within the area being monitored. This module performs tracking on the merge point area, and is required so as to prevent a single vehicle in said area to trigger multiple vehicle detection signals.

Notably, unlike the disclosed method and system, another approach includes an auto merge solution relying on tracking vehicles all the way from the order point until the merge point. Depending on the camera angles that are available for a given restaurant, the performance of this approach can be susceptible to heavy occlusions as illustrated in FIG. 1. In the case of the presently disclosed method and system, however, occlusions are rarely a factor, since tracking is performed after a merge has occurred in an area of the drive-thru that can only hold one vehicle at a time. The two tracking regions are compared in FIG. 10, where the trajectories supported by the other tracking solution include arrows 62 and 64, and the tracking region required to be supported by the currently disclosed appearance based classification method and system includes arrow 60.

4) Classifier Module 56

A classifier module makes a frame-by-frame decision about whether the vehicle detected at the merge point by the vehicle detection module or tracked by the vehicle tracking module is coming from the inner or the outer ordering point. According to an exemplary embodiment of the algorithm, two linear kernel Support Vector Machine (SVM) classifiers trained on extracted Histogram of Gradient (HOG) features of training images of vehicles are used. Other exemplary embodiments may include fewer or more classifiers trained and applied. For example, other classifiers such as those based on SVMs with non-linear kernels, neural networks, supervised clustering and decision trees can be used. Likewise, other features including texture-based features such as local binary patterns (LBP), successive mean quantization transform features (SMQT); features based on color attributes (e.g., color histograms); scale invariant features such as scale invariant feature transform (SIFT) features or speeded up robust features (SURF); and local image descriptors, such as bag of visual words (BOV) or Fisher vectors. As disclosed earlier, before the classifier module can be employed on incoming video, a classifier has to be trained in a training stage. Application of the trained classifier to incoming video occurs in an online stage.

Training Stage: Each classifier (i.e., one classifier for each merging lane) is trained independently with manually labeled positive samples comprising images with vehicles coming from the lane assigned to the classifier and manually labeled negative samples comprising images with no vehicles, and images with vehicles from the lane not assigned to the classifier. The training samples are converted from RGB to grayscale; subsequently, HOG features are extracted from the resulting monochromatic images and fed to a linear kernel SVM classifier training stage. The classifier is trained to discriminate the positive samples from the negative samples by finding rules that separate their corresponding feature representations.

In another embodiment, a single multi-class classifier is trained to discriminate between images of vehicles coming from each of the merging lanes. For example, in the case where two lanes merge into a single lane, the trained classifier is a binary classifier where class 1 corresponds to images of vehicles merging from lane 1 and class 2 corresponds to images of vehicles merging from lane 2. A larger number of merging lanes can be supported.

In yet another embodiment, a single multi-class classifier is trained to discriminate between images of vehicles coming from each of the merging lanes as well as images not containing vehicles. In this case, if the number of merging lanes is N, then the number of classes in the classifier is N+1.

Online Stage: After each classifier is trained, it is applied to live video acquired by the video acquisition module. According to one exemplary embodiment, the classifiers are only applied to frames for which a vehicle has been detected by the vehicle detection module or for which a vehicle is being tracked by the vehicle tracking module. According to another exemplary embodiment, the classifiers are applied to every frame, and their outputs used to perform both vehicle detection and lane order origin determination.

In the alternative embodiment where a single, multi-class classifier with number of classes equal to the number of merging lanes, the classifier may be only applied to frames for which a vehicle has been detected by the vehicle detection module. In the alternative embodiment where a single, multi-class classifier trained with classes corresponding to images of vehicles merging from each lane and an additional class corresponding to images with no vehicles, the classifier may be applied to every frame, or to frames for which a vehicle has been detected by the vehicle detection module.

Table 1 below illustrates two modes of operation, where it is assumed that classifier 1 was trained with positive samples from the inner lane and classifier 2 was trained with positive samples from the outer lane. The output of each classifier is a real number, positive if the classifier makes a decision that the input image contains a positive vehicle sample, and negative otherwise. In embodiment 1, a decision is made only if a vehicle has been previously detected by the vehicle detection module or is currently being tracked by the tracking module. In embodiment 2, the output of the classifier itself is used as an indicator of the initial presence of a vehicle if a vehicle is not already being tracked. The detected initial presence of a vehicle triggers a tracking event for subsequent frames. Note that the instance where the output of both classifiers is positive occurs rarely, but a decision still needs to be considered for those cases. In those instances, a decision can be made, for example, by picking the class for which the decision has a higher confidence. Other decisions such as waiting for a future frame where no conflict between classifiers exist can also be made.

TABLE 1

| C1 Output | C2 Output | Decision in Embodiment 1 | Decision in Embodiment 2 |
|---|---|---|---|
| ≤t1 | ≤t2 | No decision made | No car present |
| >t1 | ≤t2 | Incoming car from inner lane | |
| ≤t1 | >t2 | Incoming car from outer lane | |
| >t1 | >t2 | Incoming car from inner lane if C1 > C2 | |
| | | Incoming car from outer lane if C1 ≤ C2 | |

5) Merge Point Sequence Determination Module 58

The merge point sequence determination module temporally aggregates outputs of the classifier module according to the output of the tracking module. This effectively results in making a decision regarding the order in which vehicles traverse the merge point based on the outputs from the tracking and classifier modules. As described above, the output of the tracking module can be used to identify a given vehicle across a number of frames. Since a classifier-based decision can be made for each of those frames, a unified or aggregate decision can be made by performing a mathematical combination of the outputs of the classifiers for the frames deemed to correspond to a unique vehicle by the tracking module. For example, in the simplest embodiment, a majority vote across the decisions made for each frame corresponding to a given vehicle is the output. According to other embodiments, weighted combinations between the classifier outputs across frames can be computed. For example, decisions made on initial instances of a vehicle may be deemed to be more reliable than those made on latter instances, and so larger weights can be assigned to earlier classifier decisions.

A "subject" as contemplated herein can include a vehicle or pedestrian, and the like, that generally waits its turn in a queue(s) to receive a customized good and/or service ("event fulfillment") after placing a custom/individual request and/or order for the event. For illustrative purposes, the subjects referred to herein include vehicles, each being associated with a customer purchasing an item. However, there is no limitation made herein to the 'subject' and the end-purpose of the queue.

A "merge point" as contemplated herein is a region defined in the camera field of view where a subject enters and/or merges into a single queue lane from one of multiple queues and is now considered to be part of the queue approaching an end-event point. For illustrative purposes, the merge point referred to herein can include a region where a vehicle enters and/or merges into a single queue lane from one of multiple queues after placing an order at one of multiple side-by-side order points, and is now considered to be part of the queue approaching the service (payment and pick-up) windows.

Figure 11:
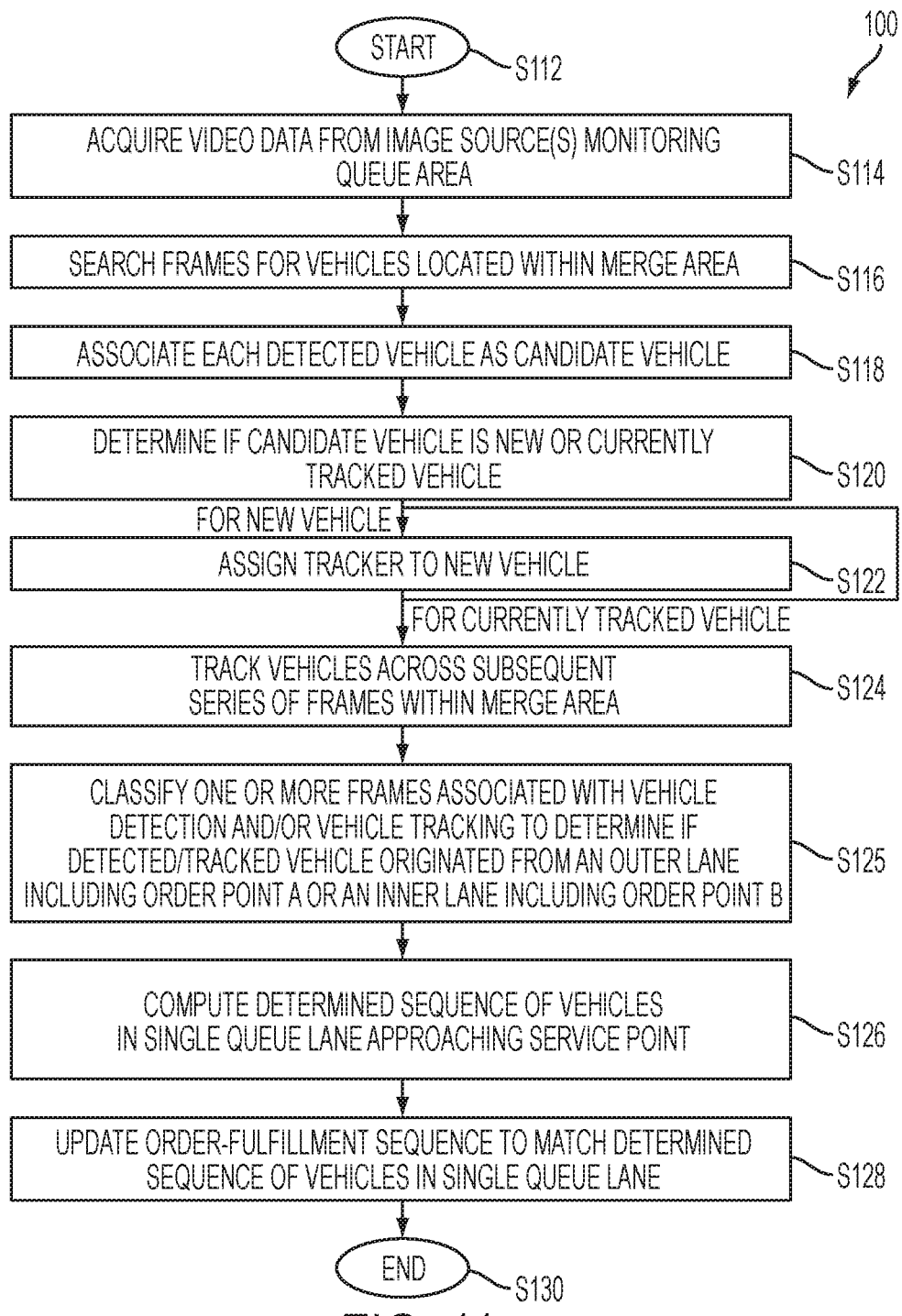
FIG. 11 is a flowchart describing an overview of a method for updating an order sequence according to the present disclosure.

FIG. 11 is a flowchart describing an overview of a method 100 for updating an order sequence according to the present disclosure. The method starts at S112. The system acquires video data from at least one image source monitoring a region of interest ("queue area") at S114, which includes a lane merge area where inner and outer lanes converge to a single queue lane. The video data is generated from at least one video camera having an individual or combined field of view that includes the lane merge point area where the separate queue lanes merge into a single queue lane. The system searches the frames, or regions of interest (ROI) defined in the frames, for vehicles located at least near the border of the lane merge point area S116. In the discussed embodiments, existing model-based approaches for background subtraction or motion detection can be used to detect the vehicle. The system associates each detected object as a candidate vehicle at S118. Generally, the system next determines whether the candidate vehicle was previously assigned a tracker or is new to the scene at S120. Mainly, the approach used for making this determination includes computing a descriptor or value, such as an attribute, a distance from other subjects, a set of features, and/or a number of tracked features in the region, etc., describing the appearance of a candidate subject and comparing the descriptor/value to thresholds or corresponding descriptors of other vehicles currently being tracked. The descriptor/value that is computed is based on the type of tracking algorithm that is being applied by the system. Similarly, the tracking algorithm applied by the system can be dependent on the model-based approach used for detecting the candidate vehicles. Based on the results of the comparison, the system classifies each candidate vehicle as belonging to one of a new vehicle-of-interest and a currently tracked vehicle category. In response to the candidate vehicle being categorized as a new vehicle-of-interest, the system assigns a tracker to the new vehicle at S122. The movement of each vehicle is tracked in and around the monitored queue merge point area over the subsequent series of frames at S124. Generally, each tracked vehicle is followed across the series of frames while its location is within a predetermined/predefined merge point area where the multiple queues converge into the single queue lane. In response to the detected/tracked vehicle traversing the predefined merge point area, at S125 the system classifies one or more frames associated with vehicle detection and tracking to determine if the detected/tracked vehicle originated from an outer lane including order point A or an inner lane associated with order point B, then the system computes a determined sequence of vehicles approaching the service point at S126. This determined sequence corresponds to when the tracked vehicles transitioned into the single queue lane relative to the other tracked vehicles. The system then updates the sequence of orders to match the observed sequence of vehicles in the single queue lane at S128. In one embodiment, the order identifier is associated with the tracker and follows the subject across the series of frames. The system can use the order identifiers to compute the updated order sequence so that the orders can be fulfilled in the sequence that is anticipated for each vehicle to reach the service point. The method ends at S130.

Figure 12:
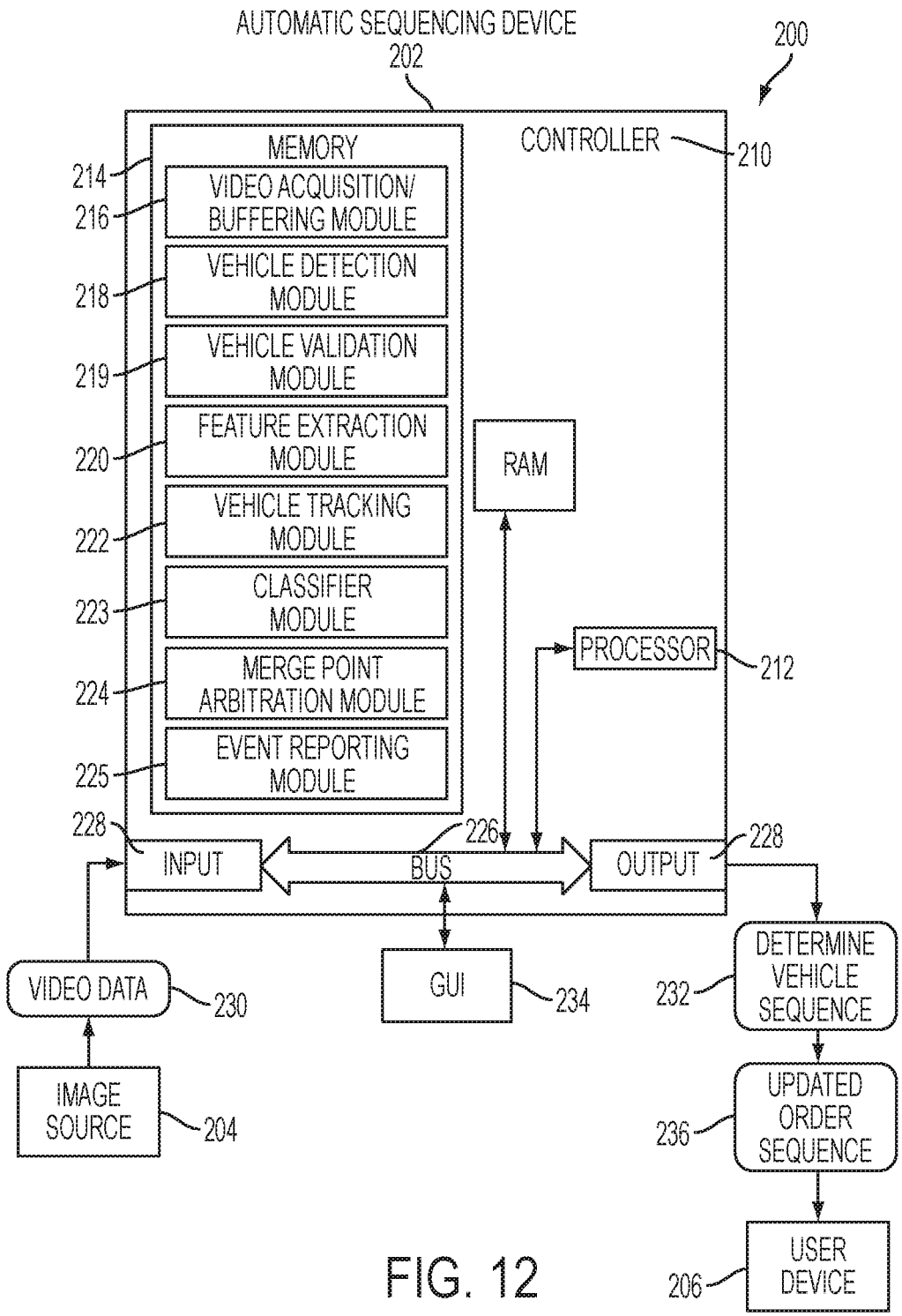
FIG. 12 is a schematic illustration of a vision-based system for automatically generating an order sequence matching a sequence in which multiple subjects transition into a merged queue lane.

FIG. 12 is a schematic illustration of a vision-based system 200 for automatically generating an order sequence matching a sequence in which multiple subjects transition into a merged queue lane. The system 200 includes an automatic sequencing device 202 and an image source 204 linked together by communication links, referred to herein as a network. In one embodiment, the system 200 may be in further communication with a user device 206. These components are described in greater detail below.

The automatic sequencing device 202 illustrated in FIG. 12 includes a controller 210 that is part of or associated with the device 202. The exemplary controller 210 is adapted for controlling an analysis of image frames or video data (hereinafter "video data") received by the system 200. The controller 210 includes a processor 212, which controls the overall operation of the device 202 by execution of processing instructions that are stored in memory 214 connected to the processor 212.

The memory 214 may represent any type of tangible computer readable medium such as random access memory (RAM), read only memory (ROM), magnetic disk or tape, optical disk, flash memory, or holographic memory. In one embodiment, the memory 214 comprises a combination of random access memory and read only memory. The digital processor 212 can be variously embodied, such as by a single-core processor, a dual-core processor (or more generally by a multiple-core processor), a digital processor and cooperating math coprocessor, a digital controller, or the like. The digital processor, in addition to controlling the operation of the device 202, executes instructions stored in memory 214 for performing the parts of the method outlined in FIGS. 11, 13A and 13B. In some embodiments, the processor 212 and memory 214 may be combined in a single chip.

The device 202 may be embodied in a networked device, such as the image source 204, although it is also contemplated that the device 202 may be located elsewhere on a network to which the system 200 is connected, such as on a central server, a networked computer, or the like, or distributed throughout the network or otherwise accessible thereto. In other words, the processing can be performed within the image source 204 on site or in a central processing offline or server computer after transferring the video data through a network. In one embodiment, the image source 204 can be a device adapted to relay and/or transmit the video data 230 to the device 202. In another embodiment, the video data 230 may be input from any suitable source, such as a workstation, a database, a memory storage device, such as a disk, or the like. The image source 204 is in communication with the controller 210 containing the processor 212 and memories 214.

The stages disclosed herein are performed by the processor 212 according to the instructions contained in the memory 214. In particular, the memory 214 stores a video buffering module 216, which acquires video data from a video of the queue merge point area; a vehicle detection module 218, which detects candidate subjects in multiple queues included in a queue area; a feature extraction module 220, which extracts features for each new candidate vehicle, a vehicle tracking module 222, which tracks the location of each detected vehicle in and around the monitored queue merge point area until the tracked vehicle is through the merge point; a merge point arbitration module 224, which computes an observed sequence of vehicles approaching the service point in response to the tracked vehicle being detected/tracked within the predefined merge point area, the system; and, an event reporting module 225, which updates the sequence of orders-for-fulfillment to match the observed sequence of vehicles in the single post-merge point queue lane. Further contemplated embodiments can also include a vehicle validation module 219, which determines if each candidate vehicle is a newly detected vehicle or a currently tracked vehicle. Embodiments are contemplated wherein these instructions can be stored in a single module or as multiple modules embodied in different devices. The modules 216-225 will be later described with reference to the exemplary method.

The software modules as used herein, are intended to encompass any collection or set of instructions executable by the device 202 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the device 202 may be all connected by a bus 226.

With continued reference to FIG. 12, the device 202 also includes one or more communication interfaces 228, such as network interfaces, for communicating with external devices. The communication interfaces 228 may include, for example, a modem, a router, a cable, and and/or Ethernet port, etc. The communication interfaces 228 are adapted to receive the video data 230 as input.

The device 202 may include one or more special purpose or general purpose computing devices, such as a server computer, controller, or any other computing device capable of executing instructions for performing the exemplary method.

FIG. 12 further illustrates the device 102 connected to the image source 204 for acquiring and/or providing the video data in electronic format. The source 204 (hereinafter "video camera 204") may include one or more surveillance cameras that capture video from the scene (queue merge point area) of interest. The number of cameras may vary depending on an extension and location of the queue area being monitored. Multiple cameras may be required where the length of a queue easily extends beyond a single camera field of view. It is contemplated that the combined field of view of multiple cameras typically comprehends the entire area surrounding the merge point area. For performing the method at night in areas without external sources of illumination or with irregular illumination from ambient sources, the video camera 204 can include near infrared (NIR) capabilities. Furthermore, the video camera 204 used in the present disclosure is operative to capture video at a frame rate that is able (sufficiently high enough) to handle one or more vehicles moving through the scene at anticipated speeds.

With continued reference to FIG. 12, the video data 130 undergoes processing by the device 202 to output the observed vehicle sequence 232 and/or the updated order sequence 236.

Furthermore, the system 200 can display the output in a suitable form on a graphic user interface (GUI) 234. The GUI 234 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 212. Alternatively, the device 202 can provide the output to a user device 206, which can display the output to a user, such as the users taking payment and/or fulfilling the orders. Furthermore, in one contemplated embodiment, the observed vehicle sequence 232 and/or the updated order sequence 236 can be transmitted to another computer application, which can perform additional processing on the data for redesigning throughput models to maximize efficiency and profit potentials.

Figure 13A:
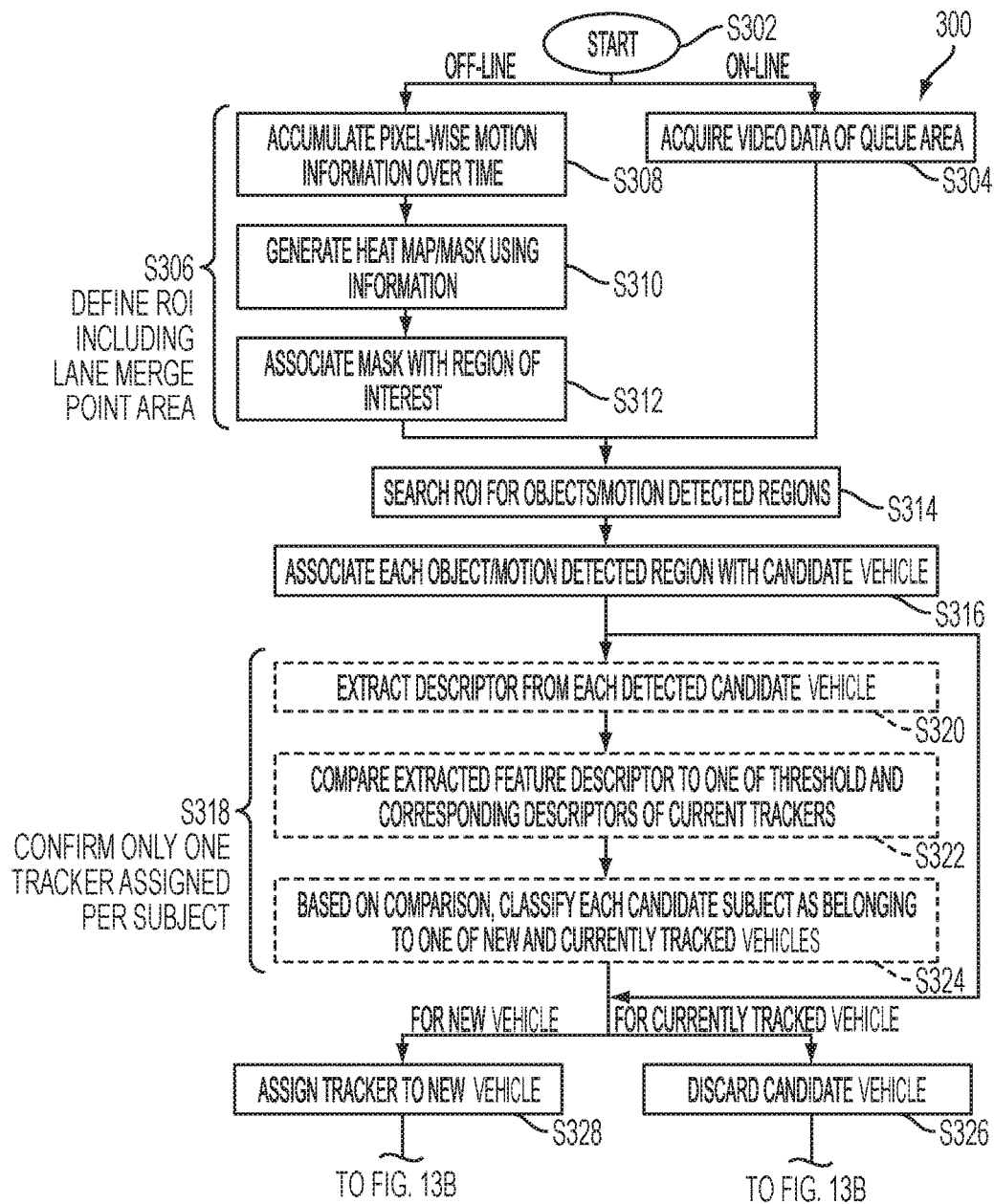
FIG. 13A-B is a detailed flowchart describing a method for automatically generating an event sequence matching a sequence in which multiple subjects merge from multiple queues into a single queue.
Figure 13B:
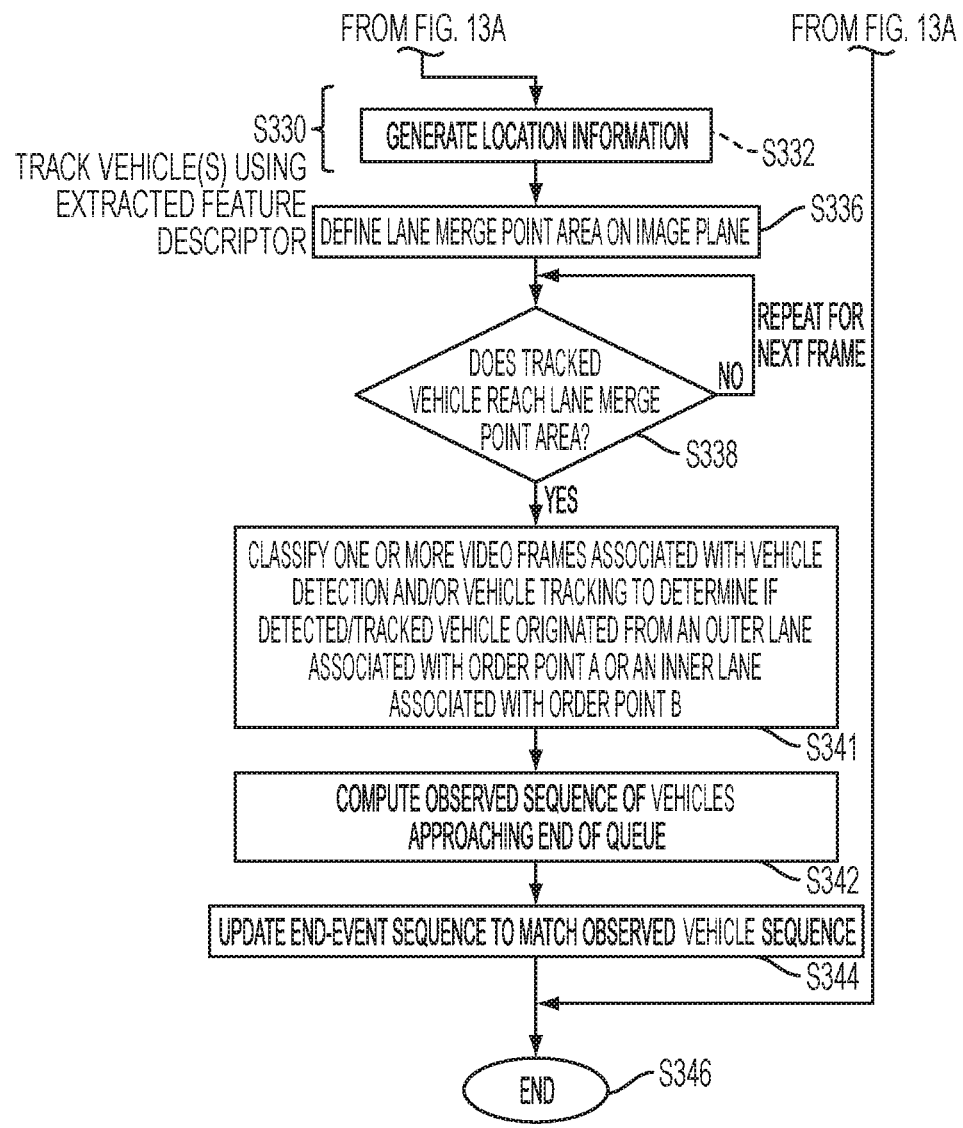
Figure 14:
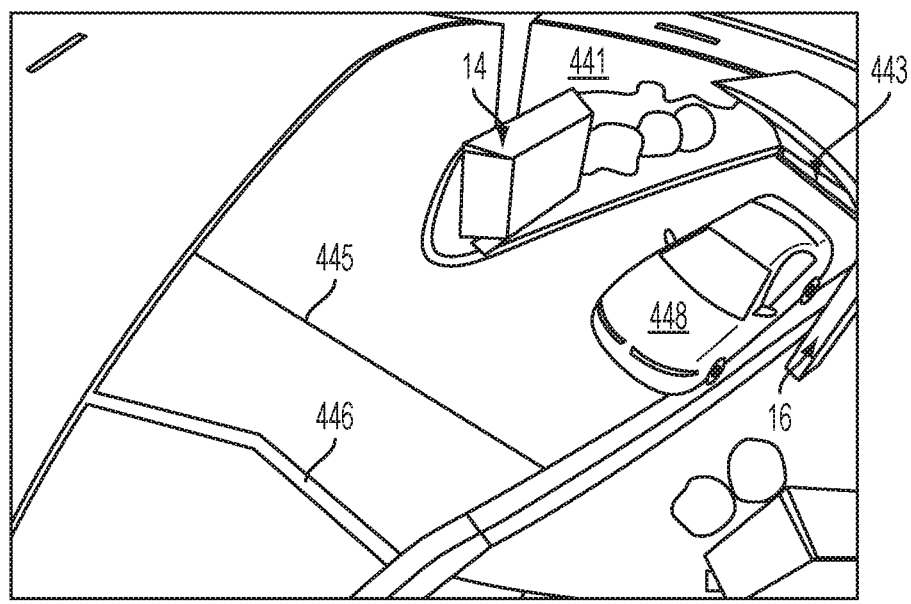
FIG. 14 shows a sample image frame including a queue area in a camera field of view.

FIG. 13A-B is a detailed flowchart describing a method 300 for automatically generating an event sequence matching a sequence in which multiple vehicles merge from multiple queue lanes into a single queue lane. The method starts at S302. The system acquires video data from at least one image source monitoring a region of interest ("queue merge point area") at S304. The video data is generated from at least one or more video cameras having an individual or combined field of view that includes a merge point area where separate queue lanes merge into a single queue lane. An example image frame is illustrated in FIG. 14, where the present method can be implemented in a fast-food drive-thru. In this illustrated example, the start points include side-by-side order entry points 14, 16 that correspond to the locations of menus where orders are placed using microphones. The merge point 446 is marked as a line in the image space. The video camera(s) includes an individual or combined field of view wide enough to capture a vehicle's 448 movement as it traverses the merge point area between lines 445 and 446. The camera(s) field of view(s) can optionally cover additional regions of the queue area including the entry portions 441, 443 of the separate queues located before the start points, i.e., where subjects enter either one of the separate queues, and the end portion of the single queue located after the merge point, such as at the service point.

The video data can be acquired directly from the video camera(s) or from an intermediate image source that stores and/or relays the video data from the video camera. Regardless, a placement of the video camera can be fixed close to the merge point area to avoid and/or minimize occlusions observed in the scene. However, the disclosure contemplates that the video buffering module 216 can support geometries for video data acquired from video cameras placed elsewhere. In other words, the system disclosed herein can process video data acquired from cameras included in existing surveillance infrastructure.

Returning to FIG. 13A, the video buffering module 216 transmits the video frames acquired from the video data to the subject detection module 218 for processing. The module 218 can process each frame, or every n-th frame, in the sequence. Similarly, the module 218 can process the entire image frame or a region of interest (ROI) defined in the frames. More particularly, the ROI can include a ROI of the image frame where new vehicles are anticipated to appear in the queue merge point area. One aspect of processing designated ROIs is that it prevents a detection of subjects ("false detections") appearing and/or moving beyond the merge point area. By defining ROIs in the image frames, the system can limit the computational burden of the subject detection phase (given a real-time requirement to keep up with traffic flow) and can reduce the number of false detections.

Therefore, a ROI including the queue merge point area can be defined in one contemplated embodiment at S306. The ROI can be defined manually by a user when the video camera is set up and calibrated. This ROI can be defined once since the queue area does not change as long as the video camera remains fixed. As the camera settings change (e.g., because of zoom, pan, tilt or translation), the defined area can be updated during a recalibration procedure.

The process can furthermore eliminate objects detected outside the queue area-of-interest ("outliers") by performing a thresholding operation on a heat map. Particularly, the process can generate a mask representing the heat map at S310, and then discard any objects that are subsequently detected outside the highlighted region.

This learning approach can be used to remove large amounts of extraneous background noise or "phantom" objects. Alternate embodiments can apply a distance from a center of these learned routes to determine the likelihood a potential new vehicle-of-interest will be detected.

Returning to FIG. 13A, the vehicle detection module 218 searches the defined ROI(s) (or entire frames) for moving foreground objects at S314. Foreground object detection in video can be achieved via a number of different methods. Two common methods of motion detection used in applications that perform analytics on video data include frame-to-frame differencing and background estimation and subtraction ("background subtraction"). The frame differencing approach detects moving objects within the camera field of view by computing pixel-wise differences between successive frames in the video stream, typically requiring tuning to a very narrow range of object speed relative to the frame rate and camera geometry. By thresholding these differences, areas containing moving objects ("motion detected regions") can be easily identified.

Alternatively, model-based approaches for motion/foreground detection can be used. In one embodiment, the system 200 performs the background subtraction approach. The background subtraction approach detects foreground objects rather than moving objects. However, moving objects also trigger foreground detection because their appearance differs from the background estimate. For example, when an image of the background, without any foreground objects, is available, a model is trained to estimate common pixel values. Mainly, background subtraction computes the absolute intensity/color difference between the known or estimated background model and each current frame in the video sequence. By comparing each current frame to the background model, the pixels of which the computed distance in the intensity/color space does not meet a predetermined threshold value are classified as background pixels and the pixels of which the computed distance in the intensity/color space meets and exceeds the threshold (i.e., do not fit the existing background model) are classified as foreground pixels. The detected foreground pixels indicate a foreground object/motion detected region.

Strategies used to maintain a background model or estimate include a historical statistical model (e.g., a parametric descriptor density model, such as, Gaussian Mixture Models (GMM) based approach or a non-parametric descriptor density model, such as, a kernel-based estimate) for each pixel is constructed, eigenbackgrounds (which use principal component analysis), computation of running averages (that gradually update the background after each next frame), and median filtering, etc. The background models are typically adjusted dynamically to account for slow variations in the background of the scene. In the contemplated embodiment, the background estimate can be continuously updated with each incoming frame at a rate controlled by a predetermined learning rate factor. However, embodiments are contemplated where the background estimate can be updated at slower rates. Other alternatives are also contemplated for constructing the current background model.

A binary mask/difference image (i.e., a foreground object mask) is generated using the pixel classifications. In one embodiment, a morphological operation that is understood in the art can be applied to the difference image to filter out sources of fictitious motion and to accurately detect pixels associated with foreground or moving objects. An example filtering technique can include applying dilation and closing operations to fill in holes in the binary mask and to bridge small gaps in regions where an object has been erroneously split into a number of smaller, separate foreground elements. Connected component analysis (CCA) can also be used to eliminate small, extraneous regions where motion is detected in the binary mask. These motion detected regions can result from foreground objects that are too small to be of interest (e.g., a bird flying through the scene) or from general image noise. Common features used in the CCA screening are object area, angle of orientation, and fill density.

At S316, module 218 associates each detected vehicle/motion detected region with a candidate vehicle-of-interest. Because module 218 may detect foreground pixels corresponding to the same vehicle/motion region in multiple frames, the vehicle validation module 219 can confirm that only one tracker is assigned per candidate vehicle at S318. To avoid "multiple sightings" of the same subject from being treated as multiple candidate subjects, the subject validation module 219 ensures that only one tracker is assigned to each detected vehicle. By managing the tracker assignments, the module 219 essentially prevents multiple trackers from being assigned to the same subject detected over multiple frames. One aspect of this validation procedure is that it can reduce the computational load needed in the tracking stage. Another aspect of this validation procedure is that it can reduce the number of erroneous event sequence detections.

The module 219 extracts a descriptor for each candidate subject at S320. Because the system applies one tracking algorithm in the contemplated embodiment, the descriptor corresponds with the selected tracking approach.

Example tracking algorithms contemplated herein include region-based tracking algorithms and point trackers. Examples of region-based tracking algorithms can include mean shift and particle filtering. Example descriptors that can be extracted for the region-based tracking algorithms include attributes such as color histograms and/or histograms of oriented gradients, etc., and the distance of the detected motion region to each currently tracked subject. Mainly, these tracking algorithms consider the entire subject as a region. An example of a point tracker can includes KLT tracking. Example descriptors that can be extracted for point trackers includes a set of features from the motion detected region or a number of currently tracked features in the motion detected region. Mainly, point trackers consider sets of localized entries, such as hard edges, corners, and interest points of the candidate subject (foreground object).

The module 219 compares each descriptor to one of a predetermined threshold and currently tracked descriptor at S322. Based on the comparison, the module 219 categorizes each candidate vehicle as belonging to one of a newly detected vehicle and a currently tracked vehicle at S324.

For region-based tracking algorithms, if the extracted descriptor is an attribute of the candidate vehicle, the attribute is compared with the attributes of currently tracked vehicles. In response to the attributes of the motion detected region not matching the attributes of any currently tracked vehicle, the module 219 categorizes the candidate vehicle as belonging to a newly detected vehicle. In response to the attributes of the motion detected region matching the attributes of a currently tracked vehicle, the module 219 categorizes the candidate vehicle as belonging to a currently tracked vehicle.

If the extracted descriptor is the computed distance between the motion detected region and each currently tracked vehicle on the image plane, the computed distance is compared to a predetermined distance threshold. In response to the computed distance meeting and exceeding the predetermined threshold, the module 219 categorizes the candidate vehicle as belonging to a new vehicle. In response to the computed distance not meeting the predetermined threshold, the module 219 categorizes the candidate subject as belonging to a currently tracked vehicle.

For point trackers, if the extracted descriptor is a set of features from the motion detected region, the set of features is compared to the sets of features of currently tracked vehicles. The number of matching features is counted. In response to the number of features not meeting a predetermined threshold number, the module 219 categorizes the candidate vehicle as belonging to a newly detected vehicle. In response to the number of features meeting and exceeding the predetermined threshold number, the module 219 categorizes the candidate vehicle as belonging to a currently tracked vehicle.

Similarly, if the extracted descriptor includes a number of currently tracked features in the motion detected region, this number is compared to a predetermined threshold. In response to the number of currently tracked features not meeting a predetermined threshold number, the module 219 categorizes the candidate vehicle as belonging to a newly detected vehicle. In response to the number of currently tracked features meeting and exceeding the predetermined threshold number, the module 219 categorizes the candidate vehicle as belonging to a currently tracked vehicle. The logic behind this approach is when a vehicle being tracked is moving, the motion detected blob will overlap with the tracked vehicle and will contain a set of features already being tracked.

One embodiment is contemplated however which performs the validation independent of the tracking mode. For example, once the subject detection module 218 detects a candidate subject, the module 219 can determine whether that the detected candidate subject overlaps a predetermined percentage of the detected candidate subject in a next frame. In response to the overlap meeting and exceeding the predetermined percentage, the module 219 can determine the number of consecutive frames that the overlap threshold is met. In response to the number of consecutive frames meeting and exceeding a predetermined threshold number, the module 219 classifies the candidate subject as belonging to a new subject. In response to the number of consecutive frames not meeting the predetermined threshold number, the module 219 categorizes the candidate subject as belonging to a currently tracked subject. In one embodiment, the threshold number can be five (5) consecutive image frames.

In response to the candidate vehicle being classified as belonging to a currently tracked vehicle, the module 219 discards the subject at S326. However, a feature extraction module 220 assigns a tracker to each new subject, i.e., detected vehicle, at S328. More specifically, the module 220 assigns the descriptor (attributes or features) extracted at S320 to the tracker. However, for embodiments that omit the validation procedure (S318-S324), a descriptor is extracted for each new vehicle. As mentioned supra, the descriptor can be based on the tracking algorithm later applied by the system. For example, if a point tracker such as KLT is applied, then the extracted features can be selected from a group consisting: Harris corners, scale-invariant feature transform (SIFT) features, and speeded-up robust features (SURF). Likewise, if a region-based tracker such as mean-shift is to be used, then the extracted features can include color attributes of the object region, such as a color histogram.

The features can be extracted from either color or grayscale images. In embodiments where NIR illumination is used, the module 220 can extract Harris corner features or gray-level histograms from grayscale images.

Alternatively, in one embodiment, a template of the detected motion region (i.e., a cropped sub-image of the new subject-of-interest) can be used as a set of features.

The extracted descriptor (hereafter "features") is transmitted to the vehicle tracking module 222, which tracks the extracted features across subsequent frames in the video stream at S330. The tracking algorithm used by the module 222 processes features that are consistent with the ones extracted by the previous modules 219, 220. As mentioned supra, the module 222 can apply one of a number of different tracking approaches including, but not limited to mean-shift tracking, contour tacking, Kalman filtering, KLT tracking, and particle filtering, etc. Generally, the module 220 determines the location of each tracked subject across subsequent frames at using the trackers. The module 220 anticipates that the subjects move with the queue in the scene, and the locations therefore change over time. For each frame that a vehicle remains within the camera (or combined cameras) field of view, the module 220 generates tracking data describing the location of the subject in pixel coordinates at S332.

In one embodiment, the module 220 can perform a motion consistency test at S334 to verify that the movement of the tracked features is consistent with that of a rigid object. By monitoring the overall motion/movement of the set of features for a given subject, features which are not moving jointly with the set, i.e., features which were initially extracted from the motion detected region but have drifted onto other elements of the scene at some point, are identified and removed from the feature set. This test can be performed, for instance, to detect initial features that were erroneously chosen on background areas immediately surrounding the tracked subject-of-interest or to remove features corresponding to another subject or object that occludes the camera's view of the tracked subject. Particularly, this removal occurs when one of the first and second vehicles moves from its initial location, or as both vehicles move in slightly different directions. This type of pruning can produce a smoother, more robust tracking performance and improve the overall accuracy of the present system, particularly for queue configurations having a close-quarters layout and a large number of start-and-stop events.

For an illustrative example, in an embodiment where the tracking approach used by the system includes a KLT point tracker with Harris corner features, the set of tracked Harris corner feature points can be adjusted dynamically (pruned) to account for features which are not "well-behaved".

In one alternate tracking embodiment, a template of the detected motion region (i.e., a cropped sub-image of the new subject-of-interest) can be used as a set of features. A template matching approach is used to locate the best match for this template in a subsequent frame. The template is updated each time a new location is determined in order to deal with slowly varying illumination, pose, etc.

The subject tracking module 222 transmits the tracking data/location information to the merge point arbitration module 224. For a given frame, the merge point arbitration module 224 can define a location of the merge point region at S336. Alternatively, a virtual line can be defined on the image plane. This step can be executed once since the merge point does not change as long as the camera configuration and queue configuration remain the same.

Using the location information associated with each tracked vehicle, the module 224 determines if the tracked vehicle is within the defined merge point at S338. In response to the tracked vehicle crossing into the merge point region of the given image frame (YES at S338), the module 224 associates the subject as being merged into the single queue at S340. At this point, the module 224 continues tracking that vehicle in subsequent frames while the vehicle traverses the merge point area.

The determination at S338 can compute and compare any statistic of the tracked feature locations to the location of the merge point. For example, in one embodiment a single point can be computed from the location information that roughly identifies the position of the tracked subject. For point trackers, such as a KLT tracker, this single point can be the centroid of the tracked feature locations. Other example statistics can include a centroid, a median center location, a first point, a predetermined percentage in the feature points, and a last point, etc. that pass into the merge point region. Alternatively, the module 224 can compute a convex hull containing the points being tracked. The module 224 can detect the merge event when a predetermined percentage of overlap between the hull and a defined merge region occurs. A similar approach can be used when kernel- or region-based trackers are applied by the system, where the overlap between the kernel of the tracker and the merge region can be measured, and a merge event is triggered when a degree of the overlap meets and exceeds a predetermined threshold.

Once the detected vehicle is categorized as having merged into the single queue at S340, S341 classifies one or more video frames associated with vehicle detection and/or vehicle tracking to determine if detected/tracked vehicle originated from an outer lane associated with order point A or an inner lane associated with order point B. An observed sequence of subjects approaching the service point at S342. As part of this computation, module 224 essentially computes where the tracked subject-of-interest places in the observed sequence of subjects. The module 224 can transmit this computed observed sequence to the event reporting module 225.

Because the system can optionally track subjects from their respective order entry points, the event reporting module 225 can determine a correct sequence of information associated with each subject (such as "orders" in the illustrated embodiment) that matches with the observed sequence. The module 225 corrects and/or updates the end-event sequence at S344. In the illustrated example, the end-event can include the orders that need to be fulfilled at one or both of a payment and pick-up point. Particularly, the module 225 can update the end-event sequence using the identifier assigned to each subject when said subject was detected. Because the identifier followed the subject with the tracker, the module 225 can update the sequence to fulfill the event associated with each identifier in the same sequence that the subject will arrive at the end point.

The module 225 can provide this updated sequence to a user computer device 206, such as the restaurant point of sale (POS) system in the illustrated example. In summary, the module 225 translates each new merged vehicle into a message to the user device. In alternate embodiments, the event-reporting module 225 may also report non-merge events. These non-merge events may indicate when subjects depart from or cut into the queue. The method ends at S346.

The re-sequencing information computed by the present disclosure is amenable to like environments where a process is initiated in side-by-side queues and completed in a single-lane queue after the side-by-side queues converge, and particularly where process and its output follows the person in the queue. Non-limiting examples of businesses that can employ the present disclosure include banks (indoor and drive-thru teller lanes), grocery and retail stores (checkout lanes), airports (security check points, ticketing kiosks, boarding areas and platforms), restaurants (such as fast food counters and drive-thrus), theaters, carwashes, and the like, etc.

Although the method 300 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 200, wherein the disclosure is not limited to the specific applications and embodiments illustrated and described herein.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of automated sequencing of vehicles merging from multiple lanes into a single lane, the method comprising:
a) an image-capturing device capturing video of a merge-point area associated with multiple lanes of traffic merging;
b) detecting in the video a vehicle as it traverses the merge-point area;
c) classifying the detected vehicle associated with traversing the merge-point area as coming from one of the merging lanes; and
d) aggregating vehicle classifications performed in step c) to generate a merge sequence of detected vehicles, wherein the multiple lanes of traffic merging correspond to a side-by-side drive-thru, and the side-by-side drive-thru includes an inner drive-thru lane and an outer drive-thru lane.

2. The computer-implemented method of automated sequencing of vehicles according to claim 1, wherein a detected vehicle is tracked until the detected vehicle is outside the merge-point area.

3. The computer-implemented method of automated sequencing of vehicles according to claim 1, wherein the vehicle detection is performed using one or more of temporal differencing of video frames, background estimation and subtraction, optical flow, and classifier-based vehicle detection.

4. The computer-implemented automated sequencing of vehicles according to claim 1, wherein step c) uses one or more classifiers trained with positive and negative video samples including vehicles approaching the merge point from a first lane, and positive and negative video samples including vehicles approaching the merge point area from a second lane.

5. The computer-implemented method of automated sequencing of vehicles according to claim 1, wherein step c) uses a first classifier trained with positive and negative video samples including vehicles approaching the merge point area from a first lane, and a second classifier trained with positive and negative video samples including vehicles approaching the merge point area from a second lane.

6. The computer-implemented method of automated sequencing of vehicles according to claim 1, wherein a detected vehicle is tracked until the detected vehicle is outside the merge point area and the detected vehicle is classified for a plurality of video frames while the detected vehicle is tracked.

7. The computer-implemented method of automated sequencing of vehicles according to claim 6, wherein a mathematical combination of classifications is used to generate the merge sequence of the detected vehicles.

8. An image processing system comprising:
a processor and a memory operatively associated with the processor, the processor and memory and execute instructions to perform a method of automated sequencing of vehicles merging from multiple lanes into a single lane, the method comprising:
a) an image capturing device capturing video of a merge-point area associated with multiple lanes of traffic merging;
b) detecting in the video a vehicle as it traverses the merge-point area;
c) classifying the detected vehicle associated with traversing the merge-point area as coming from one of the merging lanes; and
d) aggregating vehicle classifications performed in step c) to generate a merge sequence of detected vehicles, wherein the multiple lanes of traffic merging correspond to a side-by-side drive-thru, and the side-by-side drive-thru includes an inner drive-thru lane and an outer drive-thru lane.

9. The image processing system according to claim 8, wherein a detected vehicle is tracked until the detected vehicle is outside the merge-point area.

10. The image processing system according to claim 8, wherein the vehicle detection is performed using one or more of temporal differencing of video frames, background estimation and subtraction, and optical flow.

11. The image processing system according to claim 8, wherein step c) uses one or more classifiers trained with positive and negative video samples including vehicles approaching the merge point from a first lane, and positive and negative video samples including vehicles approaching the merge point area from a second lane.

12. The image processing system according to claim 8, wherein step c) uses a first classifier trained with positive and negative video samples including vehicles approaching the merge point area from a first lane, and a second classifier trained with positive and negative video samples including vehicles approaching the merge point area from a second lane.

13. The image processing system according to claim 8, wherein a detected vehicle is tracked until the detected vehicle is outside the merge point area and the detected vehicle is classified for a plurality of video frames while the detected vehicle is tracked.

14. The image processing system according to claim 13, wherein a mathematical combination of classifications is used to generate the merge sequence of the detected vehicles.

15. A system for updating an event sequence, the system comprising an automatic sequencing device including a memory and a processor in communication with the processor configured to:
   receive a number of individual order requests from the two order points, each order request being received when a vehicle is located in the one of the two order points;
   acquire video data of a lane merge point area from at least one image source, the merge point area associated with the convergence of two vehicle queue lanes from two respective order points to a single queue lane;
   process one of frames and at least one region of interest (ROI) in frames of the video data to detect a vehicle including at least a portion of the vehicle in the lane merge point area;
   track a movement of each detected vehicle through the lane merge point area over a subsequent series of frames until the detected vehicle is outside the lane merge point area;
   in response to the detected and tracked vehicle associated with the lane merge point area, classify one or more video frames as including a vehicle coming from an outer lane associated with order point A or a vehicle coming from an inner lane associated with order point B; and
   update a sequence of the orders to match the determined sequence of vehicles in the single queue lane.

16. The system of claim 15, wherein the processor and memory is further configured to:
   classify each detected vehicle as belonging to one of a new detected vehicle and a currently tracked vehicle;
   in response to the detected vehicle being a new vehicle, assign a tracker to the new vehicle; and,
   in response to the detected vehicle being a currently tracked vehicle, discard the detected vehicle.

17. The system of claim 16, wherein the processor and memory is further configured to:
   extract a feature descriptor from each detected vehicle;
   compare the extracted feature descriptor to one of a threshold and corresponding descriptors of current vehicle trackers; and
   based on the comparing, classify the detected vehicle as belonging to one of a new vehicle and a currently tracked vehicle.

18. The system of claim 15, wherein the order points and lane merge point area is associated with a fast-food drive-thru.

19. The system of claim 15, wherein the processor and memory is further configured to:
   compute a statistic of tracked feature locations of the detected vehicle;
   compare the statistic to a location of the lane merge point area; and
   determine if a location of the tracked detected vehicle reaches the predefined lane merge point area based on the comparison,
   wherein the statistic is selected from a group consisting of a single point identifying a position of the tracked detected vehicle, a centroid of the tracked feature locations, a median center location of the tracked feature locations, a first point, a predetermined percentage of feature points, a last point, and a degree of overlap.

20. The system of claim 15, wherein vehicle detection is performed using one or more of temporal differencing of video frames, background estimation and subtraction, and optical flow.

* * * * *